United States Patent [19]
Reimer

[11] 3,759,091
[45] Sept. 18, 1973

[54] ENGINE INLET DISTORTION TESTING APPARATUS

[75] Inventor: Robert M. Reimer, Cincinnati, Ohio

[73] Assignee: General Electric Company, Cincinnati, Ohio

[22] Filed: July 2, 1971

[21] Appl. No.: 159,393

[52] U.S. Cl. ................................................. 73/116
[51] Int. Cl. ........................................ G01m 15/00
[58] Field of Search ...................... 73/116; 251/208, 251/212

[56] References Cited
UNITED STATES PATENTS
3,396,904  8/1968  Janette............................ 251/212 X
3,392,585  7/1968  Bentz et al........................ 73/116 X Primary Examiner—Jerry W. Myracle
Attorney—Derek P. Lawrence, Thomas J. Bird, Jr., Oscar B. Waddell, Lee H. Sachs, Joseph B. Forman and Frank L. Neuhauser

[57] ABSTRACT

Apparatus is disclosed for testing the capability of a compressor or gas turbine engine to operate under conditions where the normal, generally uniform pressure distribution of the inlet is distorted by pressure gradients as may be encountered in aircraft maneuvers. Three discs are provided in a simulated engine inlet. All of the discs have equispaced, registerable apertures. The middle disc comprises inner and outer sectors which are angularly adjustable to control the extent to which their apertures are registered with the apertures of the immediately adjacent downstream disc and thus the degree and location of distortion. The upstream disc is rotatable to provide dynamic pressure distortion patterns. The upstream disc is adjustable toward and away from the other discs to vary the severity of the dynamic distortions.

7 Claims, 11 Drawing Figures

Patented Sept. 18, 1973 3,759,091

INVENTOR.
ROBERT M. REIMER

ATTORNEY

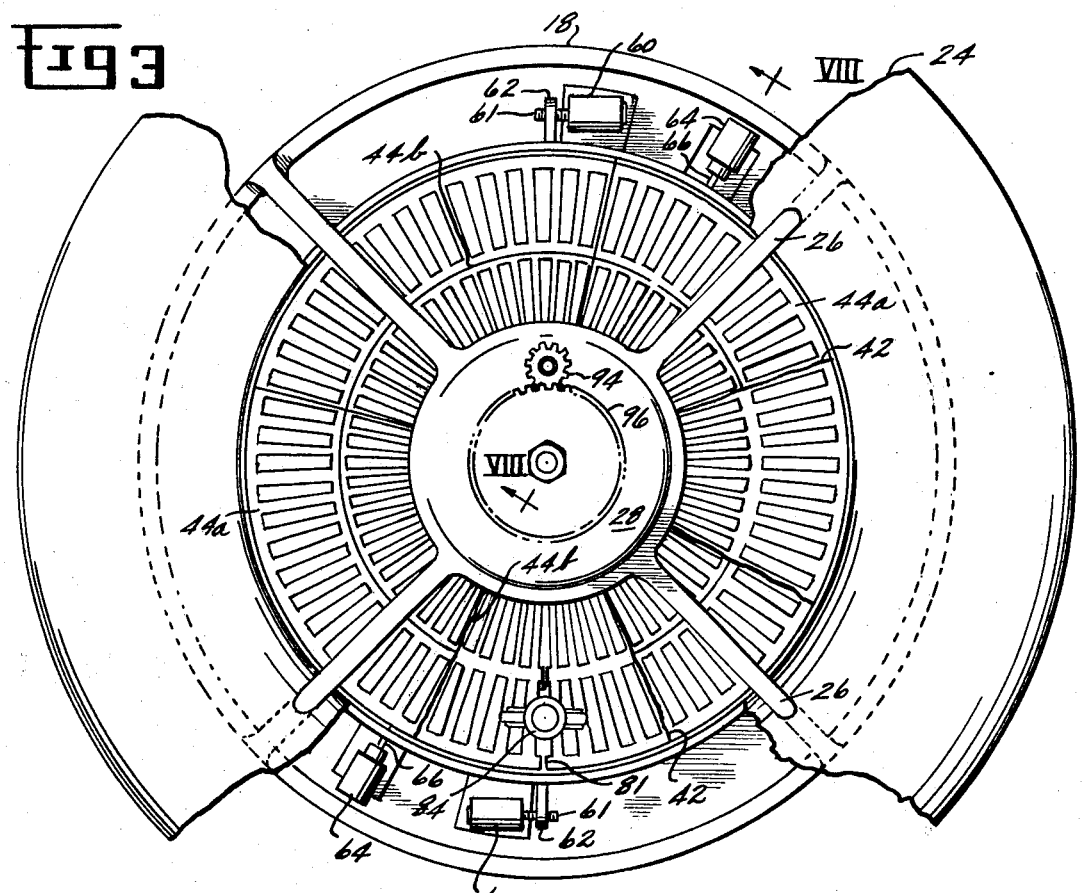
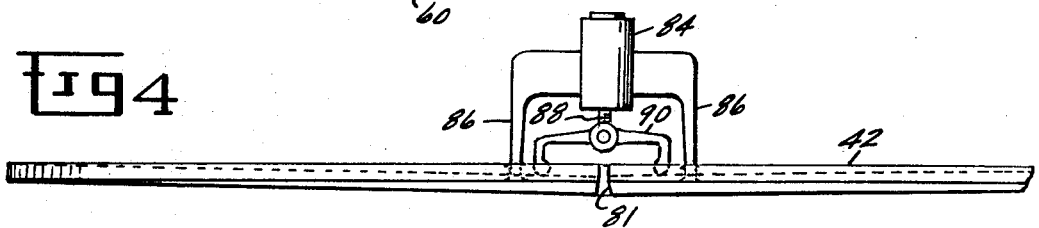
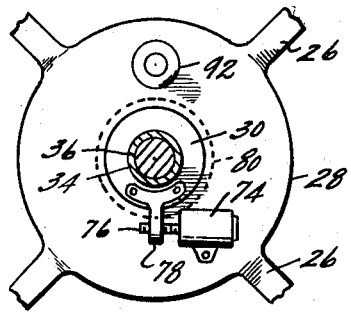

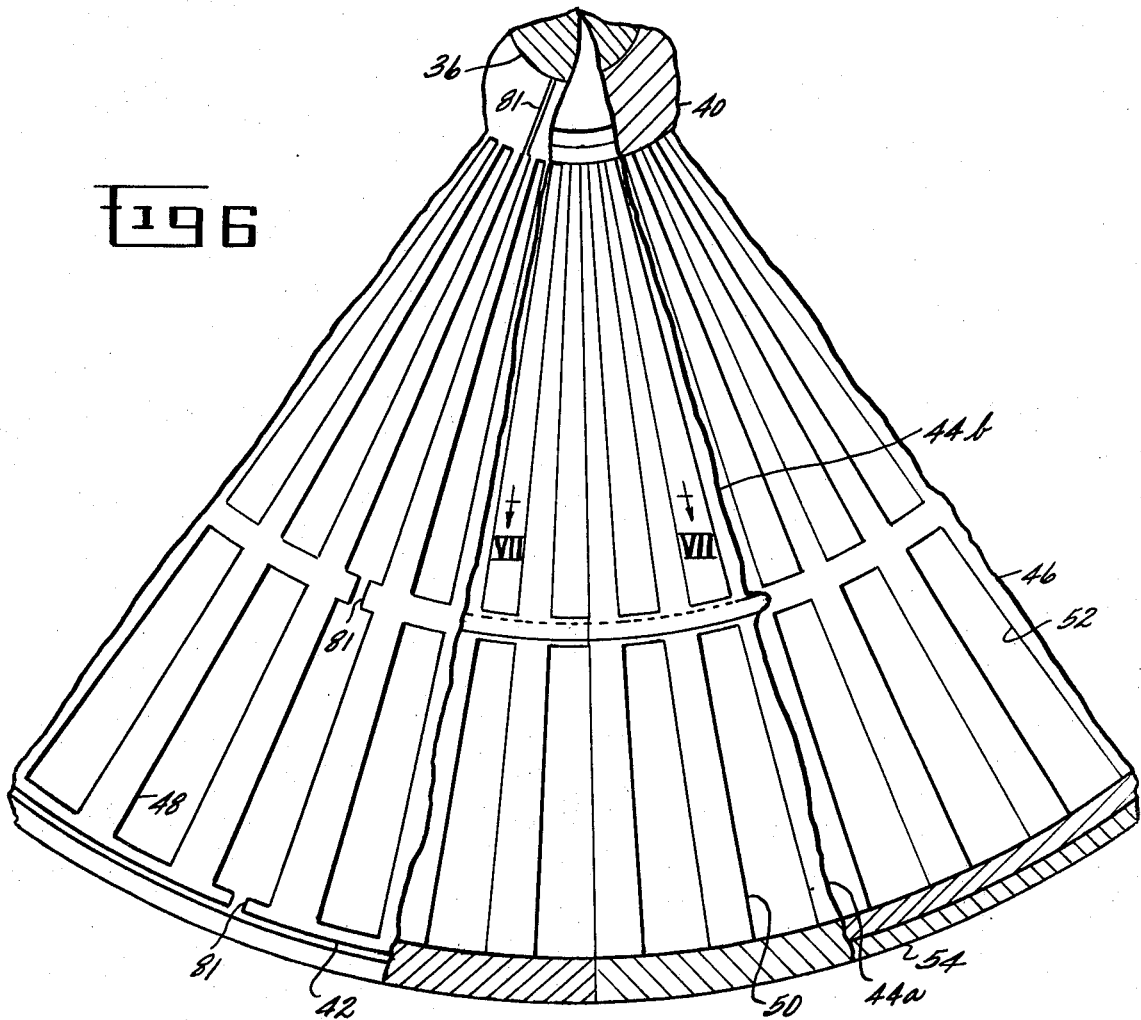

Patented Sept. 18, 1973
3,759,091
4 Sheets-Sheet 4
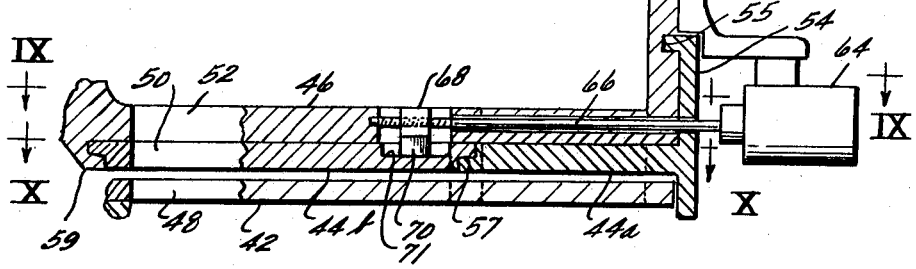
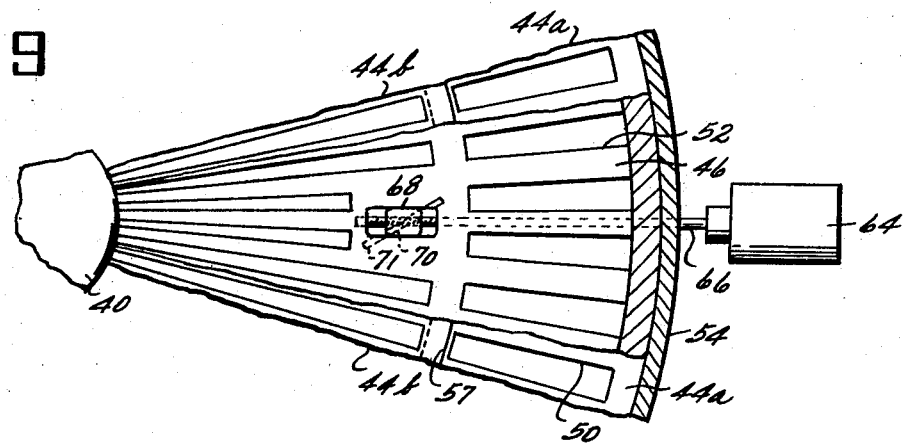
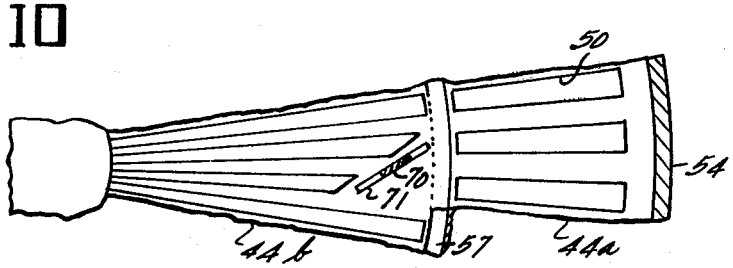
INVENTOR.
ROBERT M. REIMER
BY
ATTORNEY

ENGINE INLET DISTORTION TESTING APPARATUS

The present invention relates to improvements in testing apparatus and, more particularly, to improved apparatus for testing the capability of a compressor or gas turbine engine to operate under distorted inlet pressure conditions.

Gas turbine engines, when installed in aircraft, are provided with an inlet which is designed to provide air to the engine with essentially an even pressure distribution thereof at the entrance to the compressor of the engine. This air is then pressurized in the generation of a motive fluid stream for the propulsion of the aircraft in a well-known fashion. Various factors, such as the characteristics of the engine/inlet installation relative to the aircraft, ambient wind currents, and aircraft maneuvers during flight, result in what is termed inlet distortion where the ideal uniform pressure distribution of the air entering the compressor is lost and pressure gradients of greater or lesser severity exist. These pressure gradients can occur at various sectors relative to the compressor entrance and may be steady state or of a dynamic, fluctuating pressure type. Such pressure distortions, dependent upon their severity, will cause the compressor to stall, i.e. separation of air will occur at the airfoil blades of the compressor resulting in a reduction or loss of flow of air through the compressor and a consequent reduction or loss of power from the engine. The ability of a compressor to operate under such distorted engine conditions is a necessary characteristic of any given turbine engine and further, the limits of distortion under which the engine can operate in a stall-free manner must be known in order that operational limits may be placed on the aircraft to assure safe operation.

Prior inlet distortion test apparatus has been based primarily on the use of a simulated engine inlet having provisions for mounting different screens which have various degrees of selective blockage to create desired pressure variations at the entrance to the compressor of an engine under test. Generally each distortion condition to be tested requires a different screen that must be mounted on the simulated inlet. This is both expensive and time consuming in a test operation and further lacks any real degree of flexibility. In order to simulate dynamic inlet distortion pressure variations, the primary approach has been to inject pressurized air at desired circumferential and radial locations in the simulated inlet, either alone or in combination with the screens mentioned previously. This approach can also be expensive and further does not provide the capability of simulating rapid pressure fluctuations which are encountered in some significant flight conditions as for example where a "buzz" condition is encountered in the inlet of a supersonic engine.

Accordingly, the object of the present invention is to provide improved inlet distortion test apparatus for the compressors of gas turbine engines which has the capability of economically providing a wide range of pressure distortion test conditions, both statically and dynamically.

The above ends are attained by an inlet distortion apparatus comprising a simulated inlet adapted to lead to the entrance of a compressor and including a fixed, apertured disc disposed within the inlet and a rotatable, apertured disc also disposed in the inlet adjacent the fixed disc. A third apertured disc may also be provided in contiguous relation with the fixed, apertured disc. The third apertured disc is angularly adjustable relative to the fixed disc, preferably through the use of individually adjustable sectors, to control the degree of registration of the apertures of the third disc and the fixed disc.

Dynamic distortion is obtained by rotating the rotatable disc and the degree of severity of the dynamic distortion is controlled by adjusting the axial spacing between the rotatable disc and the adjacent of the other two discs.

The above and other related objects and features of the invention will be apparent from a reading of the following description of the disclosure found in the accompanying drawings and the novelty thereof pointed out in the appended claims.

In the drawings:

FIG. 3 is a view, with portions broken away, of the inlet end of the apparatus;

FIG. 4 is a view of a rotatable disc employed in the apparatus;

FIG. 5 is a section taken on line V—V in FIG. 2;

FIG. 6 is a section, on an enlarged scale, taken generally on line VI—VI in FIG. 2 with portions broken away;

FIGS. 7 and 7a are sections taken on line VII—VII in FIG. 6;

FIG. 8 is a section, on an enlarged scale, taken on line VIII—VIII in FIG. 3;

FIG. 9 is a section taken on line IX—IX in FIG. 8; and

FIG. 10 is a section also taken on line IX—IX in FIG. 8 but looking in the direction opposite that of the arrows.

Figure 1:
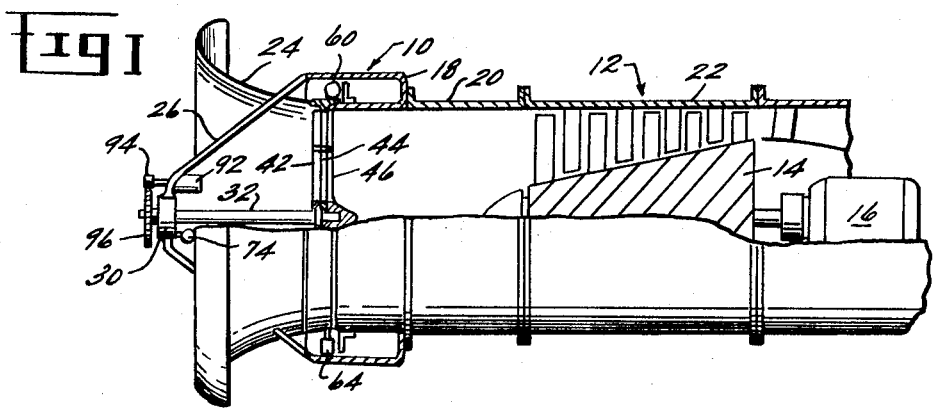
FIG. 1 is an elevation, partly in section, of the present inlet distortion apparatus coupled to an axial flow compressor.

FIG. 1 illustrates an inlet distortion testing apparatus 10, of the present invention, mated with an axial flow compressor 12 as used in a gas turbine engine. For illustrative purposes, the rotor 14 of the compressor is shown driven by an electric motor 16. It is to be understood that the test apparatus could be installed or mated to a fully operative and complete gas turbine engine if desired.

The test apparatus 10 comprises a main frame 18 which is connected by a spacer shell 20 to the casing 22 of the compressor 12. A bellmouth 24 is mounted on the frame 18 and forms in combination therewith and with the spacer shell 20 a simulated inlet for the compressor 12.

Four struts 26 (FIGS. 2 and 3) project forwardly from the frame 18 upstream of the entrance to the bellmouth 24. These struts support a central hub 28 in which an axially disposed bushing 30 is mounted. A compositely formed shaft 32 is journaled in the bushing 30. The shaft comprises an outer sleeve 34 and an inner rod 36. The sleeve 34 is locked against axial movement relative to the bushing 30 by snap rings 38. The rod 36 projects into a downstream hub 40 to provide a journal for the opposite end of the shaft 32 where three discs 42, 44 and 46 are positioned within the simulated inlet.

The disc 42 is mounted on the shaft 32, being clamped between the end of the sleeve 34 and a collar on the rod 36. The disc 44 is compositely formed of four outer, 90° sectors 44a and four inner, 90° sectors 44b which are respectively supported on the frame 18 and the hub 44. The disc 46 is supported by the frame 18 and, in turn, provides support for the downstream hub 40. Each of the discs 42, 44 and 46 (see also FIG. 6) have apertures which are preferably registerable and take the form of equispaced radially extending slots 48, 50 and 52, respectively. The slots in each disc are formed in inner and outer circumferential rows to give stiffness to the discs and also to provide for adjustment of the disc 44 as will now be described.

The disc 44 is adjustable relative to the disc 46 to control the degree of registration of the slots 50 and 52 and thus the pressure distortion created. Flange segments 54 project from the outer peripheries of the sectors 44a and are captured in a circumferential slot 55 in the frame 18. The inner and outer peripheries of the sectors 44a and 44b are respectively provided with mating lips 57 (FIG. 8) which hold them in a common plane. The inner peripheries of the sectors 44b are captured in lips 59 formed on the inner hub 40. The radially adjacent portions of the sectors 44a and 44b have overlapping lip arrangements, seen in FIG. 7, which permit independent, limited rotational movement of these sectors.

The outer sectors 44a may be individually adjusted relative to the disc 46 by servomotors 60 mounted on the frame 18. Each servomotor 60 operates a jackscrew 61 (FIG. 3) which is threadably received by a lug 62 connected to the flange 54 of each sector 44a. A servomotor 64, also mounted on the frame 18, is provided for each of the inner sectors 44b and controls a threaded screw element 66 (FIGS. 8 and 9) which is received by a camming member 68 slidable in a radial slot formed in the disc 46. A dog 70 on the camming member 68 is received in an angular slot 71 formed in the segment 44b.

Rotation of the screws 66, as controlled by the motors 64, rotates the segments 44b as desired to obtain a required degree of registration between the slots 50 thereof and the corresponding inner row of slots 52 in the disc 46. FIG. 7A illustrates a disc 44b adjusted so that its slots 50 are completely out of register with the slots 52 while the slots of the adjacent disc 44b remain in registered relation. Similarly, rotation of the motors 60 control the angular position of the sectors 44a to obtain a desired registration between the slots 50 thereof and the outer row of slots 52 of the disc 46.

Figure 2:
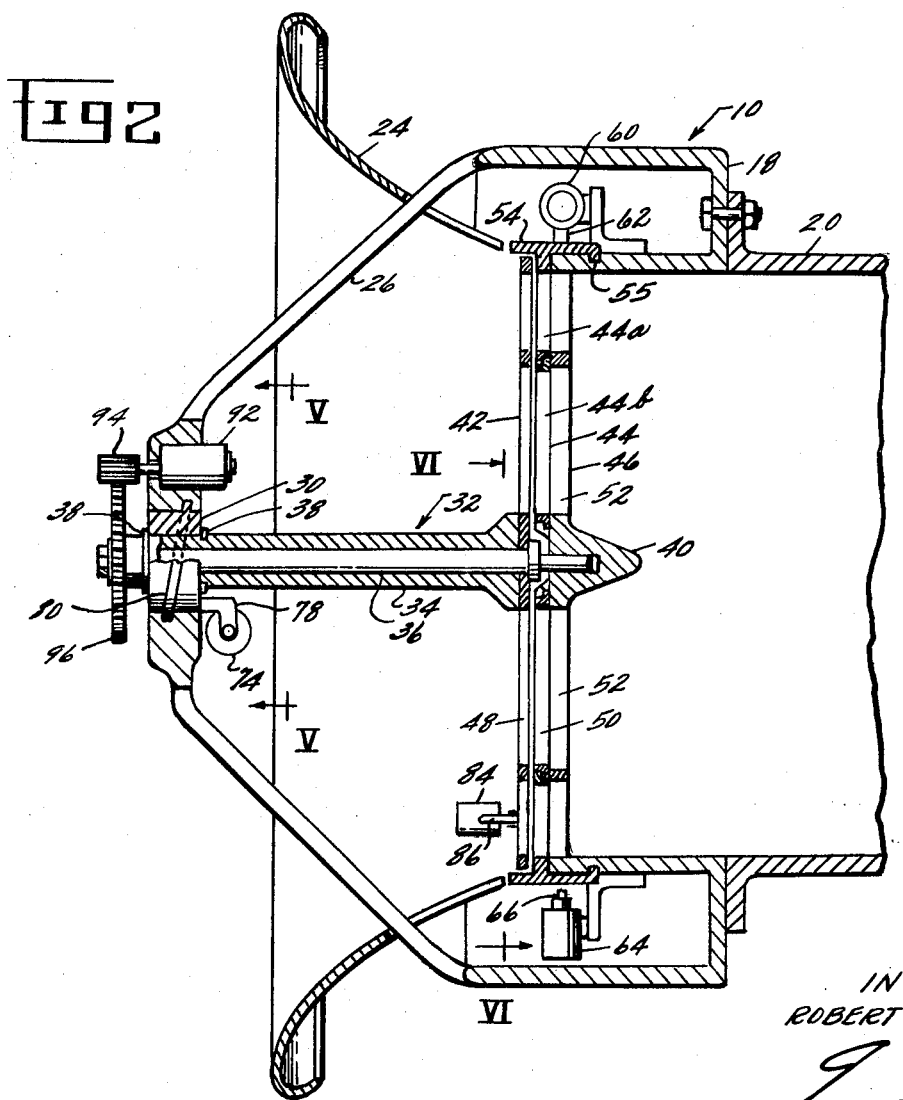
FIG. 2 is an enlarged longitudinal section of the testing apparatus.

The axial spacing between the disc 42 and the disc 44 may be controlled by a motor 74 mounted on the hub 28 (FIGS. 2 and 5). The motor drives a jackscrew 76 which is threadably received by a spherically mounted bushing in a lug 78 which is secured to the bushing 30. The bushing 30 has a thread 80 received by a corresponding groove in the hub 28. Thus, rotation of the bushing 30 will draw the disc 42 toward and away from the disc 44.

A further adjustment is provided for controlling the degree of flatness of the disc 42. A radial slot 82 is provided across the outer web and the intermediate web of the disc 42 to its inner bore. An electrical motor 84 is mounted on the disc 42 by relatively flexible legs 86. Motor 84 operates a jackscrew 88 which bears against the intermediate joint of a toggle link 90. The disc is initially formed as a cone which would be angled away from the disc 44. Movement of the jackscrew 88 toward the disc tends to spread the toggle link 90 and bring the disc to a flat or planar condition. Slip ring connections, not shown, can be made with the motor 84 to enable this adjustment when the disc is rotating.

Provision is also made for rotating the disc 42 relative to the discs 44 and 46. To this end, a motor 92 is mounted on the hub 28 and provided with a pinion 94 which engages a gear 96 that is secured to the rod 36 to rotate the shaft 32 as well as the disc 42.

The described inlet distortion test apparatus 10 may be employed in a highly flexible manner for either static or dynamic distortion testing of a compressor, either alone or incorporated in a gas turbine engine. A base line measure of performance may first be obtained by bringing into registration the apertures or slots of the three discs 42, 44 and 46 as illustrated in FIG. 7. The edges of the slots 48 and 52 are streamlined so that there is essentially no pressure distortion at the entrance to the compressor. For static distortion tests, the slots of the disc 42 are maintained in registration with the slots of the disc 46 by locking the disc 42 in a reference position. This may be done by inserting a pin through holes 98 formed in the gear 96 and the fixed hub 28. The sectors 44a and 44b may be selectively rotated to obtain a desired pressure distortion pattern by controlling the degree of registration between the slots 50 and 52. This may be done either on a sector basis or the entire inner or outer circumferential row may be so adjusted.

For dynamic distortion testing, the disc 42 is rotated through actuation of the motor 92 at a rate which, in combination with the number of slots 48, will provide a desired cyclic fluctuation of pressure at the entrance to the compressor. The extent or degree of the severity of dynamic pressure fluctuations is controlled by the axial spacing between the disc 42 and the disc 44. When the disc 42 is contiguous with the disc 44, maximum severity will be obtained. As the axial spacing between these two discs is increased, the dynamic pressure fluctuation will progressively decrease. Since the spacing between adjacent slots progressively decreases in a radially inward direction, as the disc 42 is spaced further from the disc 44, the rate at which the dynamic pressure variations are reduced decreases more rapidly at the hub than at the outer circumference of the inlet. To compensate for this factor so that the dynamic pressure variations are essentially uniform in a radial sense, the motor 84 is actuated to allow the disc 42 to assume its conical position wherein the outer periphery is spaced a greater distance from the disc 44 than the hub area is. Dynamic distortion testing can be carried out either with the apertures of the discs 44 and 46 registered or with selected sectors 44a and/or 44b out of registration to a greater or lesser extent.

The described inlet distortion testing apparatus has a great deal of flexibility in obtaining a wide variety of pressure distortion tests in an economical and rapid fashion. It will be apparent that this flexibility could further be increased by a greater number of segments 44a and 44b. Also, the apertures could take forms other than that indicated in the drawings. The scope of the present inventive concepts are therefore to be derived solely from the appended claims.

Having thus described the invention what is claimed as novel and desired to be secured by Letters Patent of the United States is:

1. Inlet distortion test apparatus comprising a simulated inlet for connection to the entrance of a compressor and including
   a fixed, apertured disc disposed in said inlet and
   a rotatable, apertured disc disposed in said inlet adjacent said fixed disc, said rotatable disc being capable of complete rotation with respect to said fixed disc,
   said rotatable disc further being capable of axial movement with respect to said fixed disc.

2. Inlet distortion test apparatus as in claim 1 wherein the apertures of the two discs are registerable and equiangularly spaced around the discs.

3. Inlet distortion test apparatus as in claim 1 further comprising
   a third disc having apertures registerable with the apertures of the other discs, said third disc being angularly adjustable relative to the fixed disc to control the degree of registration of the apertures thereof.

4. Inlet distortion test apparatus as in claim 1 further including
   means for varying the axial spacing between the rotatable disc and the fixed disc.

5. Inlet distortion test apparatus comprising a simulated inlet for connection to the entrance of a compressor and including
   a fixed apertured disc disposed in said inlet,
   a rotatable, apertured disc disposed in said inlet adjacent said fixed disc,
   a third, apertured disc located adjacent said rotatable disc,
   the apertures of the three discs being registerable and equally angularly spaced around the disc with said third disc being angularly adjustable relative to the fixed disc to control the degree of registration of the apertures thereof, and
   said third disc comprising a plurality of inner and outer sectors which are individually adjustable in an angular sense relative to the fixed disc so that registration of the apertures thereof may be varied in an overall fashion or locally, as desired.

6. Inlet distortion test apparatus as in claim 5 wherein the rotatable disc is located upstream of the adjustable disc and the latter is upstream of the fixed disc and
   further including
   means for varying the axial spacing between said rotatable disc and said adjustable disc.

7. Inlet distortion test apparatus as in claim 6 wherein means are provided for varying the rotatable disc from a planar form to a conical form variably spacing its outer periphery from the adjustable disc.

* * * * *